United States Patent Office 3,232,887
Patented Feb. 1, 1966

3,232,887
STABILIZED AQUEOUS SOLUTIONS FOR USE IN IMPREGNATING CATALYST CARRIERS AND METHOD OF MAKING SAME
George N. Pessimisis, Berwyn, Ill., assignor to Nalco Chemical Company, Chicago, Ill., a corporation of Delaware
No Drawing. Filed May 7, 1962, Ser. No. 192,990
8 Claims. (Cl. 252—435)

This invention relates to stabilized aqueous solutions useful in impregnating catalyst carriers and the method of making same. In particular, this invention relates to aqueous solutions containing catalytically-active compounds and in addition at least a stabilizing amount of certain water soluble acidic compounds. After suitable impregnation of catalyst carriers with the solutions, the resultant products are particularly effective catalysts useful in such processes as hydrodesulfurization, hydrogenation and dinitrogenation of petroleum fractions and the like.

It is known that the metals of Group VI of the periodic table, especially tungsten and molybdenum, and their compounds, especially the oxides and sulfides have excellent activity in catalyzing a wide variety of reactions including among others, hydrogenation, dehydrogenation, oxidation, desulfurization, isomerization and cracking. The catalytic metals and compounds thereof, however, being relatively costly and having a relatively small surface area per unit weight cannot themselves be used without resort to carrier materials. Consequently, these catalytically active elements or compounds are usually applied in a diluted form to the surface of a foraminous support material. The foraminous support material is usually of a low order of activity when compared to the aforementioned catalytically-active reagents, or may even be completely inactive catalytically. Normally the carrier is impregnated by solubilizing and diluting the metals of Group VI or their compounds, applying the diluted form of these active reagents to the foraminous carrier material, and then calcining the composite to convert the catalytically-active material to other forms and particularly to the oxide. Through this method of impregnation the active material is evenly distributed over the available surface of the foraminous carrier material. Cost savings in subsequent operations result from this combination of catalytically active material and substantially inert carrier.

It is also well-known that certain metals or their compounds when used in combination with the aforementioned catalytically active materials containing elements from Group VI, result in enhanced catalytic activity. This is particularly true of the metals of the periodic Group VIII such as iron, cobalt, nickel and copper or their compounds. They may be referred to as catalyst "promoters." Many problems result when these promoters are attempted to be impregnated into a carrier along with the catalytically-active reagents of Group VI. Usual impregnation techniques cannot be employed. Rather costly and involved processes must be devised to obtain a uniform deposition over the available surface of the foraminous catalyst carrier material when both the catalytically-active elements of Group VI and Group VIII are used together.

For example, when incorporation of cobalt or nickel salts with molybdenum or tungsten compounds is attempted, stable solutions are not obtained. Thus, using prior art means, it is impossible to prepare a solution containing both elements of Group VI and Group VIII which will be sufficiently concentrated and of the requisite stability to allow subsequent uniform impregnation and distribution of the metals throughout and upon the surface area of the carrier.

Since it was not heretofore possible to obtain a single aqueous solution containing both elements of Group VI and Group VIII for use for subsequent impregnation of catalyst carriers, methods have been devised whereby the catalyst carrier is first impregnated with a solution containing only one of the catalytically-active elements. After the proper impregnation the catalyst carrier is then dried and a second impregnation must be resorted to, this time with a solution containing the other desired element, that is the Group VI or Group VIII element not initially applied to the catalyst carrier. It is evident that this multiple impregnation method is costly since it involves a series of sequential process steps and permits greater loss of both catalytically active elements and carrier material. Also, uniform intermixing and uniform deposition of the metal components on and throughout the carrier is not obtained and full activity is sacrificed. For example, deposition of a cobalt or nickel salt followed by a subsequent deposition of molybdenum or tungsten compound does not give uniform deposition throughout the foraminous carrier material. One component will be deposited near the core of the support and the other in a closer relationship to the surface. The close association and coaction of the two metal compounds which is necessary for efficiency, is thereby not obtained.

Therefore, it would be an advantage to the art to prepare a stable aqueous solution containing elements from both Group VI and Group VIII suitable for use in producing a finished catalyst. If such a solution could be prepared, a single impregnation of the desired foraminous carrier material could be made by a one-step process, obviating the necessity for multiple impregnations by resort to separate solutions containing only one of the desired catalytically-active elements to be impregnated. Another advantage to be derived from use of such a single impregnation solution would be the obtaining of uniform deposition of both Group VI and Group VIII elements throughout the carrier material without isolated clumps or clusters of crystallites of catalytically active agents being formed on the surface of the carrier material. A uniform intermixture of the catalytically active elements of Group VI and Group VIII in the single aqueous solvent would also be achieved. The catalytically active materials would be in the necessary close relationship one to the other by resort to a single aqueous solution and single impregnation.

It therefore becomes an object of the invention to provide stable aqueous solutions containing therein both Group VI and Group VIII elements.

Another object of the invention is to provide stable aqueous solutions containing Group VI and Group VIII elements, and additionally containing at least a stabilizing amount of a water soluble acidic compound.

A still further object of the invention is to provide a method of preparing stabilized aqueous solutions for use in subsequently impregnating catalyst carriers, which solution contains both Group VI and Group VIII elements and additionally a minor amount of an acidic stabilizing compound.

Yet another object is to provide a stabilized aqueous solution containing both Group VI and Group VIII elements and a minor amount of an acidic stabilizing compound, which aqueous solution may be impregnated upon a foraminous carrier material in a single step process so as to produce uniform deposition of the catalytically-active elements thereupon.

A specific object of the invention is to provide a stabilized aqueous solution comprising both cobalt and molybdenum compounds and a minor amount of an acidic stabilizing compound and the method of preparing same.

Other objects will appear hereinafter.

In accordance with the invention it has been found that stabilized aqueous catalytically active solutions may now be prepared for subsequent use in a single impregnating step of any desired catalyst carriers. In its broadest aspect the invention comprises the preparation of stabilized aqueous solutions which comprise an aqueous solvent having dissolved therein catalytically active compounds containing at least one element from Group VI of the periodic table and one element from Group VIII. Preferably the aqueous solution comprises combinations containing either elements of cobalt and molybdenum, nickel and molybdenum, or tungsten and nickel. Mixtures of the above combinations may also be prepared.

The catalytically active elements from Group VIII existing as components of solutes in solutions of the invention may include Fe, Co, Ni, Pd, Pt and the like. Of these, the most preferable are Co and Ni. Group VI elements include Cr, Mo, W, Se and Te. Due to availability, relatively low cost and high activity Mo and W are most preferred among this latter group. The stabilizing material is a water soluble acidic compound which may be a hydroxy monocarboxylic acid, a polyhydroxy monocarboxylic acid, a hydroxy polycarboxylic acid, a polyhydroxy polycarboxylic acid, a monocarboxylic acid, or an oxygenated inorganic phosphorus-containing acid. These acids are all characterized by the fact that they are water-soluble and when added to catalytically active compounds containing the above combinations of elements, help to achieve long-term-stable aqueous solutions thereof.

In general terms, these stabilized aqueous solutions are prepared by adding a compound containing a Group VI element to a compound containing a Group VIII element, allowing sufficient reaction to take place so that a precipitate is formed and then immediately adding at least one of the above listed stabilizers to dissolve the precipitate. This solution may be subsequently used as an impregnating agent for foraminous catalyst carriers.

In more detailed terms, the stable aqueous solutions may be prepared by the following sequential steps:

(1) An aqueous mixture containing Group VI elements and Group VIII elements is made by combining the requisite amounts of compounds containing these same elements. The mixture is then allowed to sufficiently react until a precipitate has been formed. In order to promote this reaction heating may be effected up to the boiling point of the mixture.

(2) The above precipitate is then dissolved by using any one of the group of the aforementioned acid solutizers and stabilizers or any combination thereof.

(3) The volume of the aqueous solution is adjusted with water so as to dilute the catalytically active reagents to the desired concentration necessary for subsequent utilization with the catalyst carriers.

(4) Calcined or non-calcined granular, extruded or tabletted catalyst carriers are then impregnated with the above stable solution containing the catalytically active elements in combination with the acidic stabilizer. These solutions may be impregnated upon the carrier either by soaking, dipping or pore volume technique, which techniques will be discussed in some detail hereinafter. Thus, by a single impregnation step the necessary concentration of Group VI elements and Group VIII elements in a carrier may be achieved along with uniform incorporation upon the surface of the catalyst carrier material.

The foraminous material may be chosen from a wide variety of suitable carrier materials. Among these are silica gel, the German bleaching earth known as terrana, kaolin, magnesium silicate, magnesium carbonate, magnesium oxide, aluminum oxide, aluminum oxide prepared by precipitation, and in particular activated alumina, as well as other active aluminum oxides. Other preferred carrier materials suitable for use in the invention are bauxite, silica-alumina activated carbon, zirconia, kieselguhr, pumice and natural and synthetic clays. Combinations of the above may also be employed. The catalyst-carrier material to be impregnated may exist either in the gel, microspherical, or tabletted form. It may also exit prior to impregnation in the calcined or non-calcined state or be in a hydrated or activated form. If an uncalcined carrier microsphere is impregnated with the novel aqueous solutions of the invention, the solution may be previously adjusted in metals concentration and volume so as to give the proper moisture content for extrusion. Upon calcination the required metals concentration in the finished catalyst is then achieved.

If an excess of stable aqueous solution is used for impregnating the foraminous catalyst carrier material, the excess solution may be filtered or allowed to drain from the carrier material by gravity flow.

On the other hand, if only an exact amount of solution is desired to be used which will be substantially taken up by the catalyst carrier the subsequently formed impregnated foraminous material can then be directly dried, calcined, or treated by any conventional method to convert to the metal oxide and then if desired, to any form of the catalytically active compound such as the sulfide, chloride, or reduced metal.

In general the stable aqueous solutions containing the catalytically active elements and the stabilizing element may be impregnated into the catalyst carrier by any wellknown method. Among these the most preferred are as follows:

(1) *Hot slurry method.*—The catalyst carrier is slurried with the catalytically active aqueous solution and heated at around 180° F. for about 2–3 hours. In this method the preferred carrier is an activated alumina carrier. The now-impregnated carrier is filtered, flash dried and the moisture adjusted to the proper degree. The filtered material is extruded, and then calcined prior to packaging.

(2) *Pore volume method.*—In this method the catalyst carrier to be impregnated is first formed into pills or microspheres. The microspheres or pills are allowed to remain in contact with the stable solution for a sufficient time to uniformly fill the pores. When impregnating microspheres, exactly enough catalytically active stable solution is added to obtain a uniform wettable powder. After the requisite contact time the microspheres are extruded, predried and then calcined. This is a particularly preferred method in that no filtering step or drying technique is needed after impregnation, since the appropriate moisture content for extrusion is obtained by the use of the catalytically active stable solution.

(3) *Hot slurry method without heat.*—This is a modification of Method No. 1 wherein the catalyst carrier is slurried with the stable aqueous solution containing the catalytically active elements but no heat is applied. A longer contact time, of course, is necessary.

(4) *Soaking technique.*—In following this technique, pills of the foraminous carrier are first formed and then allowed to soak in the solution containing the catalytically active elements for a total of 1–24 hours.

The concentration of the metals of Group VI and Group VIII when added to the aqueous solvent can be varied over a wide range. However, the maximum concentration of the various metals in the solution is dependent somewhat upon the ratio of the metals of Group VIII to metals of Group VI. It has been determined that a tendency toward unstablility results when the ratio of the promoting metals, that is, the metals of Group VIII to those of Group VI is increased. It is particularly advantageous therefore to prepare solutions for catalyst preparation in which the metals of Group VI, and in particular compounds containing molybdenum and tungsten, predominate over those of Group VIII which are normally said to promote the catalytic activity of the metals of Group VI. It is desirable that in the preferred embodiment of the invention that the ratio of molybdenum or tungsten to that of the preferred promoting metals, cobalt and nickel, be at least 1:1. Most preferably, the ratio of the elements of Group VI to those of Group VIII is varied over a ratio of 1:1 to 3:1. It is understood, of course, that in solution these elements exist in the ionic form rather than the elemental state. This fact, of course, does not change the aforementioned range of ratios.

While any compound containing a Group VI element may be reacted with a substance containing a Group VIII element, the preferred species of Group VI are compounds containing Mo and W, while the substances containing Ni and Co are preferred among the Group VIII elements. The compounds containing Group VI elements may be chosen from a variety of substances but preferably molybdenum trioxide, ammonium molybdate, tungstic acid, ammonium metatungstate and ammonium paratungstate are employed as reactants.

Both water-soluble and water-insoluble salts of Co and Ni may be employed giving the invention a versatility heretofore unrealized. Preferred soluble salts of Co and Ni include nitrates, halides, sulfates, acetates and the like. Of these, nickel nitrate and cobaltous carbonate are most preferred. Preferred insoluble salts of Co and Ni are the carbonates and hydrates. These latter salts, normally considered useless in aqueous reaction systems due to relatively low water solubility, are nevertheless admirably suited as reactants in the instant invention. It is believed these relatively insoluble salts nevertheless react in the aqueous solutions of the invention with the compounds containing Group VI elements due to high reactivity with these latter compounds, and sufficient solubility, though small, for the salts to slightly ionize and molecularly contact the Mo or W compounds.

It has been noted that the most favorable results by way of long term stability, subsequent catalytic activity and ease of formation result from preparation of stabilized aqueous solutions containing Mo in combination with Co or Ni and W in combination with Ni.

When a tungsten compound is employed as one of the starting materials it is greatly preferred that a nickel compound be used in conjunction with the tungsten.

When preparing the solutions of the invention, it is preferred that an amount of metal of Group VI be added so as to prepare at least a 1.0 molar concentration of said metals in the aqueous solvent. More preferably, the molar concentration of the metals of Group VI is adjusted by addition of the parent compound so that the concentration is varied from 1.2 to 2.4 molar. In the preferred practice, a compound containing a metal of Group VIII is then added so as to produce a molar concentration such that the ratio of the elements of Group VIII to Group VI ranges from 0.33:1 to 1:1.

In preparing the solution the mode of addition of the compounds containing elements of Group VIII and Group VI is immaterial. However, it is essential that the acidic stabilizer be added only after a reaction has occurred between the above elements so as to produce a visible precipitate. As soon as this precipitate is fully formed the desired amount of acid stabilizer is added to the mixture in order to bring about the subsequent dissolution of the precipitate. Preferably the acidic stabilizer is added after the compounds containing elements of Groups VI and VIII had been allowed to react from ¼ hour to 8 hours and at temperatures ranging from 50° F. to 250° F.

The amount of acid stabilizer added is dependent, of course, upon the concentration of the catalytically active elements already in the aqueous solvent, as well as upon the ratio of the elements of Group VI to Group VIII. In a preferred practice it has been noted that particularly desirable results are obtained when the acidic stabilizer is added in such an amount so as to produce a concentration of at least 0.6 molar based on the weight of the particular acid stabilizing compound added. A higher molar concentration may be used but the most preferred range lies between 0.6 molar and 3.0 molar.

After the acid stabilizer has been added and the precipitate has been dissolved, the pH of the solution generally ranges from 1–6. More preferably the pH of the stabilized aqueous solution ranges from 2 to 5. If the solution is kept within this latter range excellent long-term stability is noted.

The treating agents used to effect both dissolution of the precipitate and also achieve long-term stability of the aqueous solution containing the catalytically active elements may be varied as to a considerable range of water soluble organic acidic substances. The preferred substances, characterized by their water solubility, are hydroxy monocarboxylic acids, polyhydroxy monocarboxylic acids, polyhydroxy polycarboxylic acids, hydroxy polycarboxylic acids, monocarboxylic acids, and organic oxygenated phosphorus-containing acidic compounds. Preferred among the organic acids are malic, malonic, tartaric, citric, gluconic, lactic, salicylic, formic, and acetic. Among these the most preferred are gluconic, citric, and formic.

The inorganic phosphorus-containing acidic compounds may also be chosen from a variety of substances. Among these are hypophosphorus acid, orthophophorus acid, metaphosphorus acid, hypophosphoric acid, phosphorus acid, phosphoric acid, metaphosphoric acid and pyrophosphoric acid. The most preferred of the phosphorus-containing acids is orthophosphoric acid, the normal tribasic acid of pentavalent phosphorus.

PREPARATION OF STABILIZED AQUEOUS SOLUTIONS CONTAINING CATALYTICALLY ACTIVE ELEMENTS

Example I

This example demonstrates the ease and facility of preparing one of the preferred stabilized aqueous solutions of the invention containing cobalt and molybdenum through use of orthophosphoric acid as the acid stabilizer.

A 2000 ml. 3-necked round bottom flask was equipped with a stirring device, heating mantle, thermometer and addition funnel. To this flask was added 900 cc. of water, 177 grams (1.26 moles) of molybdenum trioxide and 83 grams of cobaltous carbonate (0.65 mole). The mixture was heated to 180–190° F. for a period of 45 minutes with constant stirring. After elapse of this time evolution of $CO_2$ ceased and purple gelatinous precipitate had formed. 100 cc. of 85% $H_3PO_4$ (1.48 moles) was then added slowly with stirring. The dissolution of the precipitate was almost immediately noted after addition of the acid stabilizer. After the entire amount of phosphoric acid had been added, the pH of the solution was 2.2. The now stabilized aqueous solution was cooled down to 130° F. and the volume adjusted with water to 1000 cc.

Partially dehydrated Boehmite aluminum microspheres were used as the catalyst carrier for the above solution. 1452 grams of the carrier were impregnated by pore volume technique. The volume of the impregnating solution was sufficient in this example to both impregnate the microspheres by the pore volume method and also give the required moisture content for extrusion.

After the aluminum microspheres were impregnated they were extruded in a laboratory dual worm extruder to ⅛" in diameter, and the extrudates were predried at 250° F. for three hours by flowing dry air over them. Calcination was effected in the atmosphere at a temperature ranging from 950 to 1250° F. for three hours. The finished activated catalyst had a surface area of 223 m.²/gm. as determined by nitrogen adsorption. The composition of the finished catalyst was 77% alumina, 3.5% Co, 12.7% $MoO_3$, and 5.7% $P_2O_5$, all percents being by weight. The bulk density of the catalyst was 0.79. This catalyst was designated as Catalyst A.

Example II

In this example the impregnating solution was prepared in accordance with the directions outlined in Example I with the exception that the orthophosphoric concentration in the impregnating solution was reduced to 0.65 molar concentration.

The carrier was also impregnated under the same conditions as that outlined in Example I except that the impregnated materials were extruded to 5/64" rather than 1/8" size. The final catalyst material was identified as Catalyst B.

Example III

This example was prepared in accordance with the method outlined in Example II with the exception that the concentration of orthophosphoric acid in the impregnating solution was 1.3 molar concentration. The formed catalyst was designated as Catalyst C.

Example IV

This example was prepared in accordance with the method of Example II with the exception that the orthophosphoric concentration in the impregnating solution was a 2.0 molar concentration. The final catalytic material was named as Catalyst D.

Example V

The procedure of Example II was followed with the exception that the orthophosphoric concentration in the impregnating solution was a 2.7 molar concentration. Catalyst E was the final product.

Examples II–V point out the fact that the concentration of the acidic stabilizing agent may be varied over a wide range without departing from the spirit of the invention. The resultant stabilized solutions have the requisite stability notwithstanding the variation in the acidic stabilizer concentration.

Example VI

This impregnating solution was prepared substantially as described in Example I of the invention. The aqueous solution was then diluted to 4000 cc. and to this solution was added 1540 grams of partially hydrated Boehmite alumina microspheres containing approximately 1138 grams alumina on a dry basis. The alumina micropheres were then soaked for two hours, filtered, and the filter cake dried at 250° F. for four hours. The oven-dried impregnated material was adjusted for proper moisture content subsequent to extrusion and extruded to 5/64" size. The extrudate was predried at 200° F. for three hours and then separate portions were activated at two different activation temperatures of 950° F. and 1250° F. The catalysts activated at both temperatures were designated generally as Catalyst F.

This example shows that the stabilized aqueous solutions may be used to impregnate the foraminous catalyst carrier not only when an exact amount of impregnating solution is used, as demonstrated in Example I, but also when the impregnating solution is used in excess to that necessary to completely impregnate the catalyst carrier.

Example VII

The impregnating solution of this example was prepared according to the procedure outlined in Example I, with the exception that orthophosphoric acid was added so as to maintain a 0.67 molar concentration of acidic stabilizer in the aqueous solvent. Also, prior to addition of the orthophosphoric acid, the molybdenum and cobalt were added so as to create a 0.97 molar and 0.43 molar solution of the respective elements. In this example the impregnating solution was formed at a temperature of 180–200° F., and the final pH of the resultant aqueous solvent containing the catalytically active elements and the acid stabilizer was 2.1.

351 grams of a 1/8" size, already calcined aluminum extrudate were soaked for 16 hours in 630 cc. of the above stabilized aqueous solution. After the excess solution was drained off the impregnated extrudate, the impregnated pellets were oven dried at 250° F. for three hours and activated in air at 950° F. The formed catalyst was named at Catalyst G.

This example shows the versatility of the stabilized aqueous solutions in that impregnation can be effected on an already calcined aluminum extrudate pellet rather than carried out as outlined in the above examples.

Example VIII

In this example the solution technique as substantially outlined in Example I was followed with the exception that the orthophosphoric acid used as the acid stabilizer was replaced with 125 grams of citric acid (0.65 molar concentration). The catalyst prepared by following the pore volume technique outlined in Example I was designated as Catalyst H.

Example IX

The same procedure as described in Example I was followed with the exception that 250 cc. of a 47% gluconic acid solution were used to replace the orthophosphoric acid. The catalyst so formed by use of this impregnating solution was designated as Catalyst I.

Example X

In this example the technique outlined in Example I was followed. The same type and amounts of reactants were used with the exception that nickel carbonate was employed instead of cobaltous carbonate. A stabilized nickel-molybdate catalyst solution was finally prepared which had excellent activity as an active catalystic material after impregnation into a partially dehydrated Boehmite aluminum microspheres. The impregnation involved a pore volume technique.

Example XI

This example demonstrates the versatility of the invention in that a stable nickel-tungsten solution was prepared through use of the novel stabilizing acids.

A 1000 ml. 3-necked, round bottom flask was equipped with a stirring device, heating mantle, thermometer and addition funnel. To this flask was added 200 cc. of Chicago tap water which was then heated to 120° F. 100 grams of tungstic acid (Cp grade) were added to the heated water in order to form a hot slurry. To this slurry was added 100 cc. of 28% ammonium hydroxide and the mixture was then heated to 140° F. for 15 minutes. The pH of this solution was measured as 8.5.

To the above solution was added 120 grams of hydrated nickel nitrate, $Ni(No_3)_3 \cdot 6H_2O$. A precipitate was immediately formed but when 150 cc. of a 49.5% solution of gluconic acid was added the precipitate redissolved and a stable clear catalytic solution was formed. The pH of the final stabilized catalyst solution after addition of the organic acid stabilizer was 5.2.

A catalyst was prepared using the above stable impregnating solution. Excellent hydrogenating activity was noted when this catalyst was tested.

EVALUATION OF THE INVENTION

The catalysts formed by resort to the stabilized impregnating solutions of the invention were then evaluated as to their effectiveness in processing various hydrocarbons and in particular as to their activity in desulfurization.

Table I demonstrates the sulfur removal effected through the use of Catalyst A obtained in Example I. The desulfurization was carried out at a temperature of West Texas Gas Oil. The charged stock contained 1.7 weight percent sulfur and had an API gravity of 24.1. The desulfurization was carried out at a temperature of 700° F., a pressure of 450 p.s.i.g., a space rate of 4 volumes of liquid per hour to 1 volume of catalyst and a hydrogen to oil ratio of 3500 s.c.f./bbl.

TABLE I

| Catalyst | Composition (Weight Percent) | | Percent Desulfurization |
|---|---|---|---|
| | CoO | MoO$_3$ | |
| A | 3.5 | 12.7 | 62.8 |

Table II below shows the physical characteristics of Catalysts B–E of the above examples which had been activated at 950° F. for 3 hours.

TABLE II

| Catalyst | Composition | | | Physical Characteristics | | | |
|---|---|---|---|---|---|---|---|
| | MoO$_3$ | CoO | P$_2$O$_5$ | Calcination Temp., °F. | Surface Area, m.$^2$/gm. | Pore Volume, cm.$^3$/gm. | Bulk Density, gm./ml. |
| B | 12.0 | 3.1 | 3.7 | 950 | 262 | .43 | .52 |
| C | 12.1 | 3.2 | 5.9 | 950 | 241 | .40 | .60 |
| D | 11.8 | 3.1 | 9.3 | 950 | 219 | .36 | .64 |
| E | 12.4 | 3.1 | 12.1 | 950 | 178 | .33 | .60 |

These same catalysts from Table II were then tested for their hydrodesulfurization activity. A Kuwait Diesel Stock having an API gravity of 32.0 and containing 1.89 weight percent sulfur was used as the test fuel for desulfurization study.

Table III below demonstrates the effectiveness of these catalysts in removing sulfur from the Diesel stock.

TABLE III

| Catalyst | H$_3$PO$_4$ Molar Concentration in Impregnating Solution | Percent Desulfurization |
|---|---|---|
| B | 0.65 | 85.2 |
| C | 1.3 | 87.6 |
| D | 2.0 | 87.8 |
| E | 2.7 | 84.9 |

Catalysts B–E were also activated at 1250° F. for 3 hours and Table IV below shows the physical characteristics and analyses of these catalysts.

TABLE IV

| Catalyst | Composition | | | Physical Characteristics | | | |
|---|---|---|---|---|---|---|---|
| | MoO$_3$ | CoO | P$_2$O$_5$ | Calcination Temp., °F. | Surface Area, m.$^2$/gm. | Pore Volume, cm.$^3$/gm. | Bulk Density, gm./ml. |
| B | 12.0 | 3.1 | 3.7 | 1,250 | 245 | .42 | .54 |
| C | 12.1 | 3.2 | 5.9 | 1,250 | 226 | .38 | .62 |
| D | 11.8 | 3.1 | 9.3 | 1,250 | 208 | .36 | .67 |
| E | 12.4 | 3.1 | 12.1 | 1,250 | 173 | .34 | .64 |

Table V below demonstrates the sulfur removal capacity of Catalysts B–E which had been activated at 1250° F. The particular stock employed was the same hydrocarbon used to evaluate Catalyst A, and was evaluated under the same operating conditions. A conventional catalyst which had not been prepared through the use of applicant's impregnating solution, desulfurized the stock to an extent of 61%. This demonstrates the fact that not only are the process advantages realized through the use of the impregnating solutions of the invention, but also in some instances the catalyst prepared by resort to the stabilized aqueous impregnating solutions has higher activity.

TABLE V

| Catalyst | H$_3$PO$_4$ Molar Concentration of Impregnating Solution | Percent Desulfurization |
|---|---|---|
| B | 0.65 | 63 |
| C | 1.3 | 68 |
| D | 2.0 | 68 |
| E | 2.7 | 67 |

Table VI below shows the catalytic activity of Catalysts A, F and G. These catalysts were respectively prepared by impregnation of microspheres with an exact amount of impregnating solution employed, impregnation of microspheres using an excess of impregnating solution, and impregnation of carrier pellets using an excess of impregnating solution. Table VI shows that equally desirable results may be obtained by employing the stabilized aqueous catalytically-active solvents of the invention regardless of the method of impregnation subsequently employed with respect to the catalyst carriers.

TABLE VI

| Catalyst | Weight percent Composition | | | Diesel Oil percent Desulfurization | Surface Area M$^2$/gm. | | Bulk Density gm./ml. |
|---|---|---|---|---|---|---|---|
| | MoO$_3$ | CoO | P$_2$O$_5$ | | 950° F. | 1,250° F. | |
| A | 12.1 | 3.2 | 5.9 | 87.6 | 241 | 226 | .60 |
| F | 12.2 | 3.0 | 6.0 | 85.7 | 241 | 235 | .57 |
| G | 12.1 | 3.1 | 5.8 | 85.6 | 260 | 245 | .69 |

Catalysts H and I prepared by following the procedure outlined in Examples VIII and IX respectively, were also tested for their effectiveness in desulfurization of both diesel oil and heavy gas oil. Table VII below summarizes the catalytic physical and chemical properties of Catalysts H and I. This table demonstrates the fact that employment of any of the stabilizing acids of the invention does not decrease the effectiveness of the catalytic impregnation agents, but rather in many cases may improve activity with regard to hydrocarbon processing such as desulfurization when compared to conventionally prepared catalysts.

TABLE VII

| Catalyst | Weight percent Composition | | Diesel Oil—percent Desulfurization | Heavy Gas Oil—percent Desulfurization | Surface Area, M²/gm. | | Bulk Density ml./gm. |
|---|---|---|---|---|---|---|---|
| | MoO₃ | CoO | | | 950° F. | 1,250° F. | |
| H | 13.1 | 3.0 | 89.4 | 60 | 318 | 240 | .73 |
| I | 12.9 | 3.3 | 89.2 | 60 | 306 | 241 | .61 |

In conclusion it is noted that the novel compositions of the invention containing catalytically active elements and acidic stabilizers are not only stable over long periods of time, and easily prepared, but also have excellent catalytic activity when impregnated into catalyst carriers. No loss of activity is noted by resort to the necessary stabilizer, but, in fact, in many instances increase in catalytic activity is noticed.

I have thus described my invention, but I desire it understood that it is not confined to the particular forms or use as shown and described, the same being merely illustrative, and that the invention may be carried out in other ways without departing from the spirit of my invention.

Having thus described my invention what I claim as new and desire to secure by Letters Patent is:

1. A stabilized aqueous solution for use in impregnating catalyst carriers comprising an aqueous solvent having dissolved therein:
    (A) a catalytically active compound useful in chemically refining hydrocarbons, said compound containing at least one metallic element from Group VIB of the periodic table, and of at least one element from Group VIII of the periodic table, and;
    (B) at least a stabilizing amount of water soluble orthophosphoric acid.

2. A stabilized aqueous solution for use in impregnating catalyst carriers comprising an aqueous solvent having dissolved therein:
    (A) catalytically active compounds useful in chemically refining hydrocarbons, said compounds containing combinations of elements from the group consisting of cobalt and molybdenum, nickel and molybdenum, tungsten and nickel, and mixtures of said combinations, and;
    (B) at least a stabilizing amount of water soluble orthophosphoric acid.

3. A stabilized aqueous solution for use in impregnating catalytic carriers comprising an aqueous solvent having dissolved therein::
    (A) catalytically active compounds useful in chemically refining hydrocarbons, said compounds containing combinations of elements from the group consisting of cobalt and periodic Group VI molybdenum, nickel and periodic Group VI molybdenum, periodic Group VI tungsten and nickel and mixtures of said combinations, said compounds being present in an amount to give at least a 1.2 molar concentration, based on the concentration of said Group VI elements, and;
    (B) an acidic stabilizing compound comprising orthophosphoric acid which is present in at least a 0.6 molar concentration.

4. A catalyst prepared by impregnation of a catalyst carrier selected from the group consisting of activated alumina, silica gel, kaolin, magnesium silicate and clay with a stabilized aqueous solution comprising an aqueous solvent having dissolved therein a catalytically-active compound useful in chemically refining hydrocarbons, said compound containing at least one metallic element from Group VIB of the periodic table, and at least one element from Group VIII of the periodic table, and at least a stabilizing amount of water-soluble orthophosphoric acid, followed by evaporation and separation of the volatile portion of said solution from the impregnated carrier.

5. A catalyst prepared by impregnation of a catalyst carrier selected from the group consisting of activated alumina, silica gel, kaolin, magnesium silicate and clay with a stabilized aqueous solution comprising an aqueous solvent having dissolved therein a catalytically-active compound useful in chemically refining hydrocarbons, said compound containing a combination of elements from the group consisting of cobalt and periodic Group VI molybdenum, nickel and periodic Group VI molybdenum, periodic Group VI tungsten and nickel, and mixtures of said combinations, said compound being present in an amount to give at least a 1.2 molar concentration, based on the concentration of said Group VI elements, and an acidic stabilizing compound comprising orthophosphoric acid which is present in at least a 0.6 molar concentration, followed by evaporation and separation of the volatile portion of said solution from the impregnated carrier.

6. The method of preparing a catalytically active solid useful in chemically refining hydrocarbons which comprises the steps of adding to an aqueous solution:
    (A) a compound containing a metallic element of periodic Group VIB and;
    (B) a compound containing an element of periodic Group VIII;
allowing said compounds to sufficiently react until a precipitate is formed, dissolving said precipitate to produce a clear stable solution by addition of at least a stabilizing amount of orthophosphoric acid, impregnating a foraminous catalyst carrier with said stable solution, and calcining the impregnated carrier.

7. The method of preparing a catalytically active solid useful in chemically refining hydrocarbons which comprises the steps of adding to an aqueous solution:
    (A) a compound containing any one of the elements from the group consisting of molybdenum and tungsten, and;
    (B) a compound containing any one of the elements from the group consisting of cobalt and nickel with the provision that only a nickel compound be added to a tungsten compound;
allowing said compounds to sufficiently react until a precipitate is formed, dissolving said precipitate to produce a clear stable solution by addition of at least a stabilizing amount of orthophosphoric acid, impregnating a foraminous catalyst carrier with said stable solution, and calcining the impregnated carrier.

8. The method of preparing a catalytically active solid useful in chemically refining hydrocarbons which comprises the steps of adding to an aqueous solution:
(A) a compound containing any one of the elements from the group consisting of molybdenum and tungsten in an amount such that a 1.2–2.4 molar concentration of said element is produced, and;
(B) a compound containing any one of the elements from the group consisting of cobalt and nickel with the proviso that only a nickel compound be added to the tungsten compound, said compound being added in such an amount that the ratio of the elements of B to A is from 0.33:1 to 1:1;

allowing said compounds to sufficiently react until a precipitate is formed, dissolving said precipitate to produce a clear stable solution by addition of orthophosphoric acid, said orthophosphoric stabilizer being added in such an amount so as to produce at least a 0.6 molar solution concentration, impregnating a foraminous catalyst carrier with said stable solution, and calcining the impregnated carrier.

References Cited by the Examiner
UNITED STATES PATENTS

| | | | |
|---|---|---|---|
| 1,914,557 | 6/1933 | Craver | 252—461 X |
| 2,773,839 | 12/1956 | Stover et al. | 252—464 X |
| 2,889,287 | 6/1959 | Scott | 252—455 |

OTHER REFERENCES

Smith: "The Sequestration of Metals," The Macmillan Co., New York, 1959, pages 72–84 and 105–109.

Van Wazer: Phosphorus and Its Compounds, Interscience Publishers Inc., New York (1958), vol. I, pages 556–8; vol. II, page 1800.

Walton, "Scientific American," vol. 188, No. 6, June 1953, pages 68–70, 72, 74 and 76.

MAURICE A. BRINDISI, *Primary Examiner*.